3,162,543
COATED PAPER PRODUCTS AND COATING
COMPOSITIONS AND METHOD THEREFOR
Colbert W. Wilkins, Toledo, Ohio, assignor to Owens-
Illinois Glass Company, a corporation of Ohio
No Drawing. Filed Dec. 30, 1960, Ser. No. 79,565
8 Claims. (Cl. 117—76)

This invention relates to coated paper products and particularly to paper products which are characterized by being anti-stick and preventing bleed-through in nature. This invention further relates to coating compositions for this purpose.

Although paper containers have been used for packaging tacky materials such as tar, asphalt, and resins, their use for this purpose has been seriously hampered by the tendency of these materials to adhere to and to bleed through the containers even when coatings have been employed on the paper containers for these express purposes.

It is, therefore, an object of this invention to provide coated papers which are non-adherent to normally adhesive materials.

A further object of this invention is to provide a coating on paper products which serves as a bleed-proof and anti-stick agent.

A further object of this invention is to provide a film forming coating composition which can be readily modified by the addition of other chemicals to produce desired effects, such as anti-stick and other properties.

A further object of this invention is to provide coated paper products which are resistant to bleeding.

A further object is to provide compositions useful in making the above coatings for these paper products and also methods of applying said coatings on the paper products.

A further object of this invention is to provide methods for applying the above compositions to paper products.

These and other objects will become apparent from the description which follows.

Coatings characterized by having good film forming properties for paper products are provided, according to this invention, by applying a mixture consisting essentially of acetylated starch, water, and thermoplastic resin as a thin coating or film to the surface of a cellulosic material such as paper, paperboard, corrugated combined board, solid fiberboard, kraft paperboard, and the like. This mixture can be applied to the paper products by spraying, roll coating, or other conventional methods. The particular starch selected is critical, since it possesses properties distinct from other known modified or substituted starches. For example, the acetylated starches alone exhibited good film forming properties on paper even when the latter was scored or folded.

Formulations suitable for film forming coatings for paper include the following ranges:

FORMULATION A

| | Parts by weight |
|---|---|
| Acetylated starch, solids | 1.4–2.0 |
| Thermoplastic resin, solids | 0.2–0.7 |
| Water | 7–16 |

Various thermoplastic resins can be used, including polyvinyl acetate, polymethyl methacrylate, polyethyl methacrylate, ethyl-methyl methacrylate, polyvinyl chloride, polyvinylidene chloride and copolymers such as vinyl acetate-vinyl stearate, butadiene-acrylonitrile, vinyl chloride-vinylidene chloride, butadiene-styrene, and the like. Although this coating mixture employs a water base, the mixture can be modified so as to be used as an ink by diluting the mixture with appropriate chemicals. Moreover, the coating system or mixture consisting of the above three components can be further modified by the addition of other chemicals which will bring out specific properties desired of the final coating. For example, where anti-stick properties are particularly desired, as in the case of releasing tar or asphalt from paper surfaces such as kraft paperboard, it is possible to add silicones of the polysiloxane family plus recognized catalysts for silicones such as benzoyl peroxide, metal octoates or hexoates, and alkyl octoates or hexoates.

The advantages of the present coating system over other systems using silicones include the following:

First, the presence of the low cost acetylated starch in major amounts facilitates the introduction of a silicone into the composition to obtain a flexible heat-resistant film to prevent molten adhesive materials, such as hot asphalt, from adhering to the paper and bleeding therethrough. The acetylated starch was the only type of starch which was found to exhibit these properties. On the other hand, acid-washed, chlorinated, oxidized, ether-treated, and di-aldehyde starches not only lacked the bleeding-through properties but also the film-forming properties.

Second, the combination of water, acetylated starch and a thermoplastic resin resulted in a substantial reduction in the amount of relatively expensive polysiloxane needed to provide a suitable release coating. In other words, to obtain an equivalent result, considerably more of the polysiloxane would be required than when in combination with the aqueous emulsion of acetylated starch.

By way of illustration, it has been found that as little as one pound of acetylated starch and 0.1 pound of silicone solids per 1000 square feet of paper or paperboard will release mopping asphalt when poured at 350° F. and allowed to cool slowly in an oven from an initial temperature of 310° F. to an ambient temperature of about 80° F. If two pounds of acetylated starch are employed, the paper will also be bleed-proof.

The present invention will be better understood by reference to the following examples, in which all parts are by weight.

EXAMPLE I

Release and Bleed-Proof Coating

| | Lbs. |
|---|---|
| Acetylated starch | 1.34 |
| Water | 8.33 |
| Polyvinyl acetate emulsion (55% solids) | 1.34 |
| Polysiloxane emulsion (40% solids) | 0.37 |
| Catalyst (zinc octoate) (50% solids) | 0.17 |

EXAMPLE II

Release and Bleed-Proof Coating

| | Lbs. |
|---|---|
| Acetylated starch | 1.34 |
| Water | 8.33 |
| Methyl-ethyl methacrylate (46% solids) | 1.00 |
| Polysiloxane emulsion (40% solids) | 0.77 |
| Catalyst (lead 2-ethylhexoate) (50% solids) | 0.15 |

EXAMPLE III

*Release and Bleed-Proof Coating*

| | |
|---|---|
| Acetylated starch (25% solids) | 1.34 |
| Water | 5.33 |
| Copolymer of vinyl acetate and vinyl stearate (55% solids) | 0.67 |
| Polysiloxane (40% solids) | 0.50 |
| Catalyst (zinc octoate) (30% solids) | 0.15 |

EXAMPLE IV

*Release and Bleed-Proof Coating*

| | |
|---|---|
| Acetylated starch | 1.34 |
| Water | 8.33 |
| Polyalkyl methacrylate (46% solids) | 1.00 |
| Polysiloxane emulsion (40% solids) | 0.37 |
| Catalyst (zinc octoate) (50% solids) | 0.17 |

The acetylated starches employed in the above examples are also known as cornstarch acetate esters in which acetyl groups have been chemically substituted in the starch molecule. One such acetylated starch is sold under the trade name of "Kofilm."

The various thermoplastic resins referred to in the examples are well known and are readily obtainable from chemical suppliers.

The silicone resins of the polysiloxane type are well known, and are disclosed in U.S. Patents Nos. 2,610,169; 2,491,843; 2,926,829 and others. In addition, emulsions of silicone resins can be used with a catalyst such as a metal organic salt. These catalysts are disclosed in U.S. Patents Nos. 2,449,572; 2,676,948 and others.

In making a coating mixture of the present invention, the acetylated starch is given a heat treatment which involves heating the starch to 190° F. for about 5 minutes and thereafter cooling the starch to room temperature. Higher temperatures than 190° F. are to be avoided since decomposition or deleterious alteration of the starch occurs. Lower temperatures can be employed but the heating period must be increased. For example, where the acetylated starch is heated to 180° F., the heating period is 30 minutes. The starch, which has been given the foregoing pre-heat treatment, is then homogeneously mixed with the other ingredients.

In general, after a homogeneous mixture of the formulation has been made, the mixture is then applied to the paper product by any of the conventional paper coating methods. The coated paper product is then passed over a Yankee drier where the coated paper is heat cured at a temperature of 200° F. and then wound on rolls at this elevated temperature.

With kraft paperboard liner (42 lbs./1000 sq. ft.), a minimum of 1.5 lbs. per 1000 square feet of the formulation of Example I is required to impart anti-stick properties for molten asphalt, while 3.0 lbs. per 1000 square feet are required if bleed-through is to be prevented. The weights given relate to the dry weight of the components making up the formulation and do not include the water.

Since the prevention of adherence and bleed-through requires on the order of 3 lbs. of solids per 1000 square feet, it is important that a low cost, film-forming material be employed, for which the acetylated starch is admirably suited since it combines low cost with excellent film-forming properties. Although modified starches have been suggested as being suitable film-forming material or carriers (U.S. Patent No. 2,869,722), it is apparent that the acetylated starches, such as "Kofilm," employed in the present invention are not contemplated, since they have only become available subsequent to the filing of the aforementioned patent. Moreover, as has been pointed out above, the other modified starches tested have proven unsatisfactory in the novel formulations of this invention.

The above examples are merely by way of illustration, and it is to be understood that the proportions of the compositions making up the formulations or coating compositions can vary somewhat. In general, a preferred range in proportions of acetylated starch, thermoplastic resin and water is as follows for the film forming compositions, all parts by weight, air dry except for water:

TABLE I

| | Acetylated Starch | Thermoplastic Resin | Water |
|---|---|---|---|
| Maximum | 2.75 | 1.5 | 8 |
| Minimum | 0.9 | .3 | 8 |

Where a silicone is incorporated into the basic formulation for anti-stick purposes, the range in proportions is as follows, all parts by weight:

TABLE II

| | Acetylated Starch | Thermoplastic Resin | Water | Silicone Resin |
|---|---|---|---|---|
| Maximum | 2.75 | 1.5 | 8 | .3 |
| Minimum | 0.9 | .3 | 8 | .1 |

In addition, various modifications can be made in the basic three component formulation, such as the inclusion of dyes and pigments.

Although with the present invention it has been discovered that a coating of 3 lbs. of the formulation of Example I per 1000 square feet of kraft paper will prevent adherence and bleed-through of mopping asphalt; however, it has been further discovered that the coating can be applied in two steps with just as effective results but with a saving in the amount of polysiloxane emulsion used. By way of example, if kraft paperboard liner weighing 42 lbs. per 1000 square feet is first coated with 2½ lbs. per 1000 square feet of Formulation B and then with ½ lb. per 1000 square feet of Example I above by conventional methods, then the paperboard will exhibit antistick and bleed-proof properties as good as those shown by kraft paper which has been coated with 3 lbs. per 1000 square feet of the formulation of Example I above. The composition of Formulation B is as follows.

FORMULATION B

| Component: | Parts by weight |
|---|---|
| Acetylated starch, solids | 1.4 |
| Polyvinyl alcohol emulsion (55% solids) | 1.4 |
| Water | 8 |

It will be apparent that by using the two step coating process, a saving in the more expensive polysiloxane over the less expensive acetylated starch will be effected. The two coating method also tends to permit the acetylated statch to act as a more effective extender of the polysiloxane without reducing the effectiveness of the coating as an anti-stick and a bleed-proof agent.

While I have described and illustrated preferred embodiments of my invention, I wish it to be understood that I do not intend to be restricted solely thereto, but that I do intend to cover all modifications thereof which would be apparent to one skilled in the art and which come within the spirit and scope of my invention.

What is claimed is:

1. A cellulosic material having an anti-stick and bleed-proof coating thereon, which coating comprises a mixture of a catalytically polymerized, heat-cured silicone and a film-forming material consisting of acetylated starch and a thermoplastic resin wherein the ratio of starch to resin is more than one.

2. The material of claim 1, in which the resin is selected from the group consisting of polyvinyl acetate, polymethyl methacrylate, polyethyl methacrylate, ethyl-methyl methacrylate, polyvinyl chloride, polyvinylidene chloride, vinyl acetate-vinyl stearate copolymer, butadiene-acrylonitrile copolymer, vinyl chloride-vinylidene chloride copolymer, and butadiene-styrene copolymer.

3. Paperboard having an anti-stick and bleed-proof coating thereon, which coating comprises a mixture of a catalytically polymerized, heat-cured, silicone resin and a film-forming material consisting of acetylated starch and a thermoplastic resin wherein the ratio of starch to resin is more than one.

4. A film forming coating composition for paper consisting essentially of:

| Component— | Parts by weight |
|---|---|
| Acetylated starch, solids | 1.4–2.0 |
| Thermoplastic resin, solids | 0.2–0.7 |
| Water | 7–16 |

5. An anti-stick and bleed-proof composition for paper consisting essentially of:

| Component— | Parts by weight |
|---|---|
| Acetylated starch, solids | .3–1.3 |
| Water | 5.3–8.3 |
| Thermoplastic resin, solids | .7–1.0 |
| Silicone resin, solids | .1–.3 |

6. A film forming coating for paper consisting essentially of acetylated starch, water and a thermoplastic resin selected from the group consisting of polyvinyl acetate, polymethyl methacrylate, polyethyl methacrylate, ethylmethyl methacrylate, polyvinyl chloride, polyvinylidene chloride, vinyl acetate-vinyl stearate copolymer, butadiene-acrylonitrile copolymer, vinyl chloride-vinylidene chloride copolymer, and butadiene-styrene copolymer wherein the ratio of starch to resin is more than one.

7. The method of preparing a paper product which is characterized by being anti-stick and bleed-proof in nature which comprises applying to said product a first coating of the following composition:

| Component— | Parts by weight |
|---|---|
| Acetylated starch, solids | 1.4–2.0 |
| Thermoplastic resin, solids | 0.2–0.7 |
| Water | 7–16 | thereafter applying a second coating of the following composition:

| Component— | Parts by weight |
|---|---|
| Acetylated starch, solids | 0.9–2.75 |
| Thermoplastic resin, solids | .3–1.5 |
| Water | 8 |
| Polysiloxane resin, solids | .1–.3 | in which the ratio by weight of the first coating to the second coating is about 5:1 and thereafter heating the coated paper product at about 200° F. for about 5 minutes.

8. The method of claim 7 in which the paper product is paperboard and wherein the two coatings are applied in the amount of about 3 lbs. per dry weight of solids in said coatings per 1000 square feet of paperboard.

References Cited in the file of this patent
UNITED STATES PATENTS

| 1,956,866 | Keller | May 1, 1934 |
| 2,458,191 | Nichols et al. | Jan. 4, 1949 |
| 2,869,722 | Marander et al. | Jan. 20, 1959 |
| 2,885,074 | Lewis et al. | May 5, 1959 |
| 2,996,462 | Robbins | Aug. 15, 1961 |
| 3,022,289 | Tischhoff et al. | Feb. 20, 1962 |